(12) United States Patent
Miller et al.

(10) Patent No.: US 12,482,048 B1
(45) Date of Patent: Nov. 25, 2025

(54) SYSTEM AND METHOD FOR COORDINATING COMMUNICATION AND DATA COLLECTION

(71) Applicants: Wayne Allan Miller, Land O'Lakes, FL (US); Bruce Wayne Miller, Land O'Lakes, FL (US)

(72) Inventors: Wayne Allan Miller, Land O'Lakes, FL (US); Bruce Wayne Miller, Land O'Lakes, FL (US)

( * ) Notice: Subject to any disclaimer, the term of this patent is extended or adjusted under 35 U.S.C. 154(b) by 0 days.

(21) Appl. No.: 18/801,151

(22) Filed: Aug. 12, 2024

(51) Int. Cl.
*G06Q 50/18* (2012.01)
*G06Q 50/26* (2024.01)

(52) U.S. Cl.
CPC .......... *G06Q 50/18* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 6,501,421 B1* | 12/2002 | Dutta | G06F 16/9537 342/357.22 |
| 10,354,230 B1* | 7/2019 | Hanson | G07B 15/00 |
| 2017/0046805 A1* | 2/2017 | Al-Saud | G06Q 50/18 |
| 2023/0047028 A1* | 2/2023 | Redmon | H04W 4/02 |
| 2024/0212079 A1* | 6/2024 | Bolden | G06Q 50/265 |

FOREIGN PATENT DOCUMENTS

WO WO-2008156894 A2 * 12/2008 ............ G06V 20/52

* cited by examiner

*Primary Examiner* — Lynda Jasmin
(74) *Attorney, Agent, or Firm* — Tiffany C. Miller; Inventions International Inc.

(57) ABSTRACT

A computer-implemented method for coordinating communication and data collection based on input audio signals of users when providing query results involves generating an identification database of legal representatives associated with incident types. Tags from electronic data or user input audio signals indicating incident categories are received and processed to develop the database. A recommendation engine compares query keys to reference keys in the database to identify relevant legal representatives for a desired incident type. Electronic data and audio signals from querying users are processed to generate query keys for matching with reference keys. The method facilitates communication between users and identified legal representatives by transmitting electronic data over a communication link.

20 Claims, 12 Drawing Sheets

SYSTEM AND METHOD FOR COORDINATING COMMUNICATION AND DATA COLLECTION

FIELD

The present invention relates to the coordination of communications, and more particularly methods and systems for coordinating communication and data collection related to unforeseen events or medical emergencies during an automotive incident for legal assistance.

BACKGROUND

Currently, various law enforcement agencies routinely conduct traffic stops when drivers are detained for potential legal violations or minor infractions related to automotive accidents. Many of these stops involve interactions where officers primarily gather evidence, often relying on their observations and reports rather than direct input from those involved. In typical scenarios involving incidents such as vehicular accidents, apprehensions, or arrests, individuals affected by these events often experience significant distress, making it challenging to promptly collect essential information like insurance details and incident photographs. Additionally, uncertainty about whom to contact further complicates the process. Consequently, victims frequently face obstacles in obtaining adequate compensation for the resulting personal and property damage. For example, a motorist may not fully understand their legal rights amid the stress of the situation. Therefore, there is a need for systems and methods that can systematically collect evidence and promptly involve legal representation to ensure that individuals' rights are protected and that accurate documentation supports any subsequent legal actions or claims arising from these events.

Previous methods for providing recommendations for legal representatives have typically involved manual searches or keyword-based algorithms to match users with legal professionals. These approaches often rely on users selecting a list of potential legal representatives from a general database. However, these methods can be time-consuming and may not always yield accurate, custom, or relevant results, as users may not always provide consistent or complete information in a search lookup. Additionally, some existing systems may use predetermined categories to match users with legal representatives. These systems may lack flexibility and may not account for the nuances and complexities of individual incidents. Furthermore, these systems may not be able to adapt to new or evolving incident types, limiting their effectiveness in providing accurate recommendations for legal representation. Furthermore, traditional methods of transmitting electronic data to legal representatives often involve manual processes or intermediary services to facilitate communication between users and legal professionals. These methods may be inefficient and may introduce delays in the communication process, potentially impacting the timeliness and effectiveness of legal representation. Moreover, existing systems may not provide a seamless and automated way to connect users with relevant legal representatives based on the specific incident type and user input.

However, none of these approaches have provided a comprehensive solution that combines the features described in this disclosure.

SUMMARY OF INVENTION

A system is configured for coordinating communication and data collection related to unforeseen events and/or medical emergencies during an automotive accident incident for legal assistance. The system associates legal representatives, such as attorneys, with specific incidents based on the nature of the event. For instance, if a user receives a speeding ticket or a citation for a traffic violation, the system identifies and recommends a legal representative specializing in traffic law and citations. In the event of a car crash, the system processes data from sensors and audio signals to match the user with a personal injury attorney experienced in handling automotive accident cases. For incidents involving medical emergencies during a vehicle accident, the system can recommend a legal representative who specializes in both personal injury and medical malpractice law. Additionally, if a user is involved in a non-collision accident, such as a vehicle malfunction causing injury, the system identifies a product liability attorney to provide legal assistance. By tailoring its recommendations to the specific legal needs arising from different types of automotive incidents, the system ensures that users receive the most relevant and effective legal support.

In some aspects, the techniques described herein relate to a computer-implemented method of coordinating communication and data collection based on an input audio signal of one or more users when providing query results to the one or more users, the method including: generating an identification database stored in computer readable memory, the identification database is a listing of one or more legal representatives based on one or more reference keys to an incident type, including: establishing an application on a server accessible to the one or more users, receiving, over the server from the application executing on a remote client device, tags from at least one of electronic data from one or more sensors or the input audio signal of the one or more users including one or more human perceptions of categories of an incident, wherein the one or more users indicates a presence of the incident by name of the incident type, concurrently processing the electronic data and the input audio signal of the received tags to develop the listing of the one or more legal representatives associated with the incident type of the received tags, and storing the electronic data, the one or more reference keys, and the names of the incident type indicated by the one or more users as corresponding to the received tags used to develop the reference keys; providing a recommendation, from a recommendation engine, indicating the result of the processing, to a querying user a desired legal representative from the listing of the one or more legal representatives by comparing a query key to the one or more reference keys, including: capturing in a query tag, from the querying user, the electronic data and an input audio signal of one or more human perceptions of an incident, from a desired incident type, processing the electronic data and the input audio signal of the captured query tag to develop the query key that implements logic to associate a relevant legal representative with the desired incident type based on the one or more reference keys, and automatically aligning and comparing the query key to the reference keys stored in the identification database to identify the relevant legal representative; and concurrently transmitting, over a communication link over the server from the application executing on the remote client device, the electronic data to the relevant legal representative and establishing communication between the one or more users and the relevant legal representative.

In some aspects, the techniques described herein relate to a computer-implemented method, wherein the one or more sensors is a camera interface enabled to capture one or more images of the incident.

In some aspects, the techniques described herein relate to a computer-implemented method, wherein the one or more sensors is an airbag deployment sensor to activate the camera interface when an airbag is deployed.

In some aspects, the techniques described herein relate to a computer-implemented method, wherein the one or more sensors is an accelerometer to activate the camera interface when a collision is detected.

In some aspects, the techniques described herein relate to a computer-implemented method, wherein the one or more sensors is a GPS sensor to provide a location of the incident.

In some aspects, the techniques described herein relate to a computer-implemented method, wherein the one or more sensors is a gyroscope to determine severity of the incident.

In some aspects, the techniques described herein relate to a computer-implemented method, wherein the input audio signal is captured by a microphone interface.

In some aspects, the techniques described herein relate to a computer-implemented method, wherein the remote client device in electrical communication with the one or more sensors located within a proximity to a vehicle.

In some aspects, the techniques described herein relate to a computer-implemented method, wherein the communication between the one or more users and the relevant legal representative is voice communication.

In some aspects, the techniques described herein relate to a computer-implemented method, wherein the communication between the one or more users and the relevant legal representative is a video conference.

In some aspects, the techniques described herein relate to a non-transitory computer-readable medium including processor steps that when executed by a processor perform a method, the method including: receiving a request for a legal representative from a user at a remote client device; providing a recommendation, from a recommendation engine, based on a user input signal indicating a category of an event; transmitting a listing of one or more relevant legal representatives to the remote client device based on the category of the event.

In some aspects, the techniques described herein relate to a non-transitory computer-readable medium including processor steps that when executed by a processor perform a method, further including: establishing communication between the user and a selected legal representative, selected by the user, from the listing of the one or more relevant legal representatives.

In some aspects, the techniques described herein relate to a non-transitory computer-readable medium including processor steps that when executed by a processor perform a method, wherein the communication between the user and the selected legal representative is voice communication.

In some aspects, the techniques described herein relate to a non-transitory computer-readable medium including processor steps that when executed by a processor perform a method, wherein the communication between the user and the selected legal representative is a video conference.

In some aspects, the techniques described herein relate to a non-transitory computer-readable medium including processor steps that when executed by a processor perform a method, wherein the recommendation engine providing the recommendation at least partially based on electronic data from one or more sensors, and wherein the remote client device in electrical communication with the one or more sensors located within a proximity to a vehicle.

In some aspects, the techniques described herein relate to a non-transitory computer-readable medium including processor steps that when executed by a processor perform a method, further including: transmitting electronic data from one or more sensors to the selected legal representative.

In some aspects, the techniques described herein relate to a non-transitory computer-readable medium including processor steps that when executed by a processor perform a method, further including: concurrently transmitting, over a communication link over a computer network from an application executing on the remote client device, the electronic data to the selected legal representative and establishing communication between the one or more users and the relevant legal representative.

In some aspects, the techniques described herein relate to a non-transitory computer-readable medium including processor steps that when executed by a processor perform a method, wherein the one or more sensors is a camera interface enabled to capture one or more images of the event.

In some aspects, the techniques described herein relate to a non-transitory computer-readable medium including processor steps that when executed by a processor perform a method, wherein the one or more sensors is an airbag deployment sensor to activate a camera interface when an airbag is deployed.

In some aspects, the techniques described herein relate to a computer-implemented method of coordinating communication and data collection based on an input signal of one or more users when providing query results to the one or more users, the method including: generating an identification database stored in computer readable memory, the identification database is a listing of one or more legal representatives based on one or more reference keys to an incident type, including: establishing an application on a server accessible to the one or more users, receiving, over the server from the application executing on a remote client device, tags from the input signal of the one or more users including one or more human perceptions of categories of an incident, wherein the one or more users indicates a presence of the incident by name of the incident type, processing the input signal of the received tags to develop the listing of the one or more legal representatives associated with the incident type of the received tags, and storing the one or more reference keys, and the names of the incident type indicated by the one or more users as corresponding to the received tags used to develop the reference keys; providing a recommendation, from a recommendation engine, indicating the result of the processing, to a querying user a desired legal representative from the listing of the one or more legal representatives by comparing a query key to the one or more reference keys, including: capturing in a query tag, from the querying user, the input signal of the one or more human perceptions of the incident, from a desired incident type, processing the input signal of the captured query tag to develop the query key that implements logic to associate a relevant legal representative with the desired incident type based on the one or more reference keys, and automatically aligning and comparing the query key to the reference keys stored in the identification database to identify the relevant legal representative; and establishing communication, over a communication link over the server from the application executing on the remote client device, between the one or more users and the relevant legal representative.

These together with additional objects, features and advantages of the systems and methods of fraud identification will be readily apparent to those of ordinary skill in the art upon reading the following detailed description of the presently preferred, but nonetheless illustrative, embodiments when taken in conjunction with the accompanying drawings.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate example systems, methods and processes to employ a computer-implemented method for coordinating communication and data collection during an automotive emergency based on input audio signals from one or more users. The system generates an identification database, which stores a listing of legal representatives linked to specific incident types. This is done by establishing an application on a server accessible to users and receiving tags from electronic data from one or more sensors and/or audio signals or manually input text from one or more users, which describe the incident type. The system processes this data to match legal representatives to the incident type and stores the information in the database. When a user queries the system for a legal representative, the recommendation engine captures data and audio signals related to the desired incident type. The system processes this information to generate a query key, which is then matched against the reference keys in the identification database to identify a relevant legal representative. This legal representative's information is then transmitted back to the querying user. The system also establishes communication between the user and the relevant legal representative, which can be through voice or video communication. Additionally, the system can utilize various sensors, such as cameras, airbag deployment sensors, accelerometers, GPS sensors, and gyroscopes, to capture the electronic data or detailed information about the incident. This electronic data is transmitted, over a communication link, to the legal representative, aiding in providing comprehensive legal assistance. Moreover, the system described in FIGS. 1A to 1B includes a non-transitory computer-readable medium with processor steps for a suer requesting legal representation, providing recommendations based on user input, and establishing communication between the user and the selected legal representative. The system ensures that the captured electronic data from sensors is also transmitted to the legal representative, providing them with essential information to handle the incident effectively.

Figure 1A:
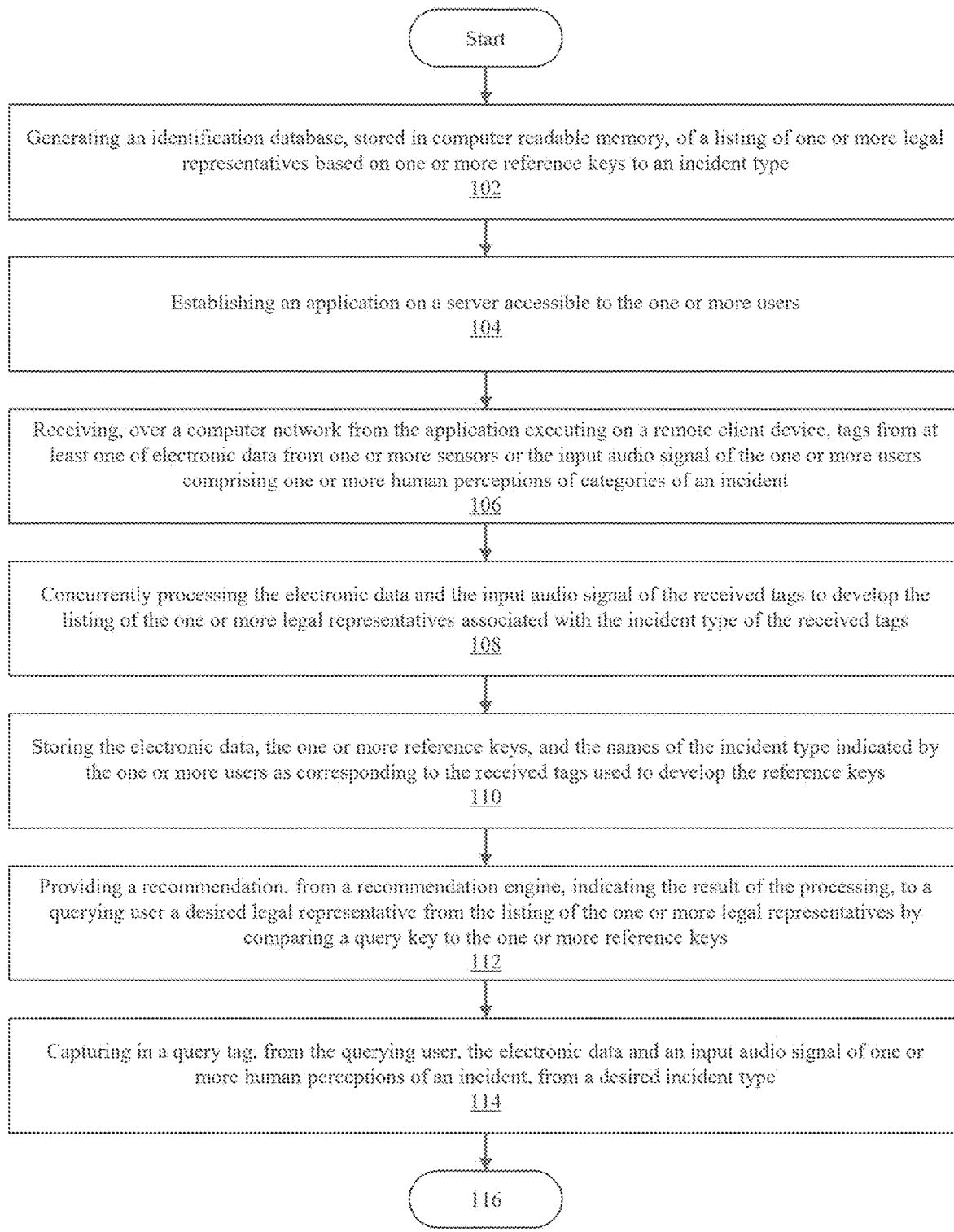
FIG. 1A is a flowchart illustrating a computer-implemented method of coordinating communication and data collection, according to some embodiments of the present disclosure.
Figure 1B:
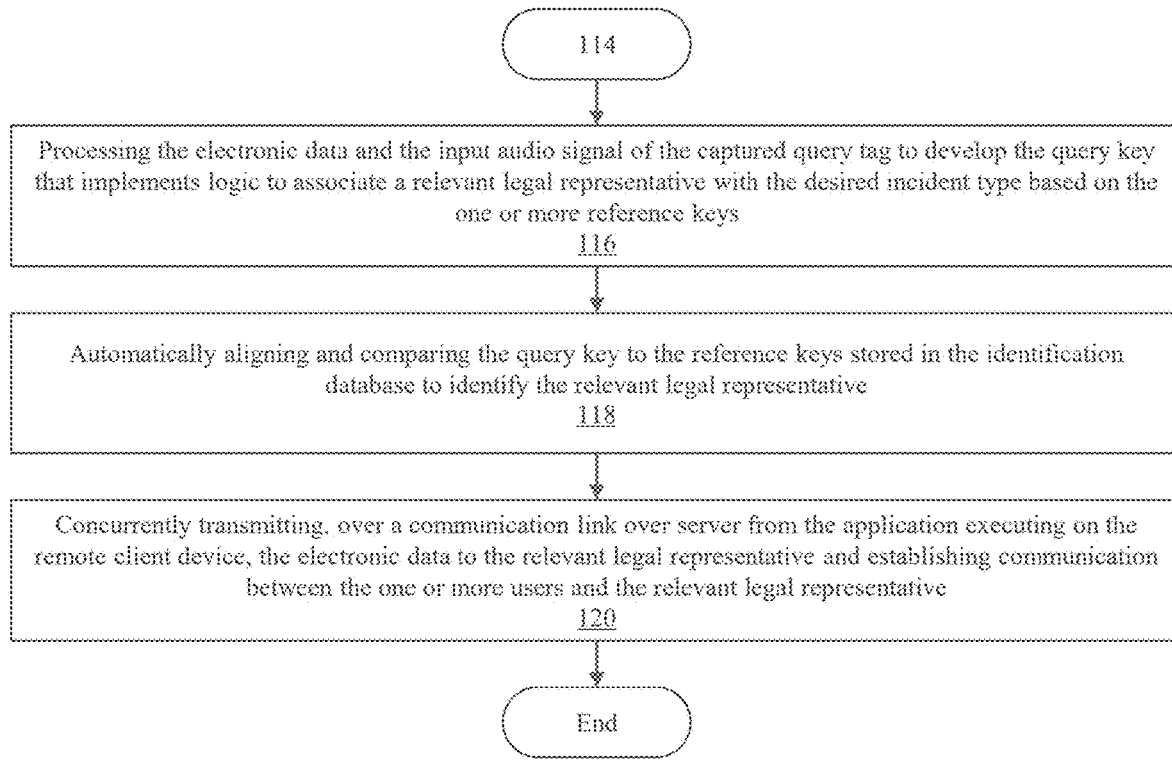
FIG. 1B is a flowchart extending from FIG. 1A and further illustrating the computer-implemented method of coordinating communication and data collection, according to some embodiments of the present disclosure.

FIGS. 1A to 1B are flowcharts that describe a computer-implemented method of coordinating communication and data collection, according to some embodiments of the present disclosure. In some embodiments, at block 102, the computer-implemented method may include generating an identification database stored in computer readable memory of a listing of one or more legal representatives based on one or more reference keys to an incident type. In implementations a legal representative may include, but not be limited to, an attorney, an agent, a law firm, a legal assistance company. In various implementations, a reference key may encompass a range of data formats including, but not limited to, textual descriptors, visual representations, or unique identifiers that characterize specific incident types. For instance, the term "collision" or a graphical depiction of a crumpled vehicle might serve as a reference key to denote an incident type associated with an "auto accident." In such cases, a legal representative specializing in auto accident litigation, such as a personal injury attorney with expertise in vehicular collisions, would be appropriate. Similarly, identifiers like "rear-end" or images showing the aftermath of a rear-end collision could be used to categorize the incident as a "rear-end collision," where a lawyer specializing in rear-end collision claims would provide the necessary legal guidance. For more specific incidents, such as a "hit-and-run," reference keys might include text or imagery related to the fleeing vehicle's characteristics or the unique circumstances of the incident. A legal representative with expertise in hit-and-run cases would be crucial in navigating the complexities of these situations. In another example, the term "ticket" or a visual representation of a traffic citation can be used to identify the incident type as a "traffic violation," where an attorney specializing in traffic law and citations would be appropriate. In the context of Driving Under the Influence (DUI) incidents, the term "drunk" or an image of an alcoholic beverage container could act as a reference key. Legal representation from a DUI defense attorney would be essential in addressing the legal challenges associated with such cases. Lastly, for incidents related to "vehicle defects," reference keys like "brake failure" or images depicting mechanical malfunctions would be used, with a product liability attorney specializing in automotive defects handling the legal aspects of these claims. This system allows for precise classification and retrieval of data relevant to various auto accident scenarios.

At block 104, the computer-implemented method may include establishing an application on a server accessible to the one or more users. At block 106, the computer-implemented method may include receiving, over a computer network from the application executing on a remote client device, tags from at least one of electronic data from one or more sensors or the input audio signal or input signal of the one or more users comprising one or more human perceptions of categories of an incident. Tags are implemented in training and refining the listing of legal representatives associated with specific incident types. For example, the system receives tags via a computer network from an application running on a remote client device. These tags can include electronic data from sensors or input signals from users, which reflect human perceptions or categorizations of the incident. For instance, tags might consist of sensor data indicating a collision, user input describing the incident as a "rear-end crash," or audio signals providing details about the nature of the accident.

In some embodiments, at block 108, the computer-implemented method may include concurrently processing the electronic data and the input audio signal of the received tags to develop the listing of the one or more legal representatives associated with the incident type of the received tags. This processing involves analyzing the tags to identify and classify the incident types accurately. By cross-referencing the received tags with a pre-existing database, the system can develop or update a listing of legal representatives who specialize in handling the specific incident types associated with the tags. For example, if the tags indicate a "DUI" incident, the system will update the listing to include legal representatives who specialize in DUI cases. This dynamic and data-driven approach ensures that the listing of legal representatives is continuously refined and aligned with the types of incidents reported by the users, thereby improving the system's accuracy and relevance in matching legal assistance with the appropriate incident types At block 110, the computer-implemented method may include storing the electronic data, the one or more reference keys, and the names of the incident type indicated by the one or more users as corresponding to the received tags used to develop the reference keys. For example, if a user reports an incident involving a "rear-end collision," the system will store the electronic data from sensors that detected the impact, such as acceleration or deceleration readings. Additionally, the reference keys derived from this data, such as the term "rear-end" or an image illustrating the crash, are saved. Alongside this, the system stores the specific names of the incident types, as indicated by the users, which in this case would be "rear-end collision." Similarly, if a user provides input related to a "hit-and-run," the system records the relevant sensor data, such as location data indicating the vehicle's departure, the reference key like "hit-and-run" or an image of the fleeing vehicle, and the incident type name "hit-and-run." By storing this comprehensive information, including the reference keys and user-specified incident types, the system can accurately categorize and manage incidents, ensuring that the data used to match users with legal representatives is both precise and up-to-date.

In some embodiments, at block 112, the computer-implemented method may include providing a recommendation, from a recommendation engine, indicating the result of the processing, to a querying user a desired legal representative from the listing of the one or more legal representatives by comparing a query key to the one or more reference keys. For instance, if a user submits a query about finding legal assistance for a "DUI" incident, the recommendation engine compares the query key, such as "DUI" or an image of an alcoholic beverage container, to the reference keys stored in the system. The engine then identifies and presents a list of legal representatives from the database who specialize in DUI cases. Similarly, if a user is seeking help for a "hit-and-run" accident, the system processes the query key related to "hit-and-run" and matches it with the stored reference keys. The recommendation engine then provides the user with a selection of legal experts who handle hit-and-run cases. By aligning the user's query with the reference keys, the recommendation engine ensures that the legal representatives suggested are well-suited to address the specific type of incident reported, enhancing the user's ability to obtain relevant and effective legal support.

At block 114, the computer-implemented method may include capturing in a query tag, from the querying user, the electronic data and/or an input audio signal or an input signal of one or more human perceptions of an incident, from a desired incident type. For instance, if a user is involved in a "multi-vehicle collision" and seeks legal assistance, the system captures electronic data such as GPS coordinates and impact force from the user's vehicle sensors. Additionally, it records input audio signals where the user might describe the accident details, such as the number of vehicles involved and the sequence of events. Similarly, in a case where a user experiences a "hit-and-run" incident, the system might capture an input signal describing the fleeing vehicle's make, model, and color, alongside any surveillance footage or witness statements uploaded by the user. These query tags, encompassing both electronic data and human perceptions of the incident, enable the system to develop a comprehensive profile of the desired incident type. For a "DUI" scenario, the system might capture breathalyzer data, time-stamped location information, and an audio signal where the user describes their interaction with law enforcement. By integrating these detailed query tags, the system ensures that the incident is accurately categorized, facilitating precise matching with legal representatives who specialize in handling such specific cases.

In some embodiments, at block 116, the computer-implemented method may include processing the electronic data and the audio signal of the captured query tag to develop the query key that implements logic to associate a relevant legal representative with the desired incident type based on the one or more reference keys. For instance, if a user submits a query related to a "multi-vehicle collision," the system processes sensor data indicating multiple impacts and audio descriptions provided by the user detailing the collision dynamics and other vehicles involved. This information is synthesized to create a query key that matches the "multi-vehicle collision" reference key, facilitating the identification of legal experts who specialize in complex traffic accidents involving multiple parties. Similarly, for a "hit-and-run" incident, the system processes captured electronic data such as dashcam footage and audio signals where the user describes the fleeing vehicle and the circumstances of the incident. By analyzing this data, the system generates a query key that corresponds to the "hit-and-run" reference key. This allows the system to recommend legal representatives who have expertise in dealing with hit-and-run cases, ensuring the user receives the appropriate legal support. In a scenario involving a "DUI" incident, the system might process breathalyzer readings and audio signals where the user details their interaction with police officers. This processed data forms a query key that aligns with the "DUI" reference key. Consequently, the system identifies and suggests legal professionals specializing in DUI defense. By leveraging the logic implemented in these query keys, the system ensures that the recommended legal representatives are well-matched to the specific incident types, providing users with tailored legal assistance based on the precise nature of their queries.

At block 118, the computer-implemented method may include automatically aligning and comparing the query key to the reference keys stored in the identification database to identify the relevant legal representative. For example, a user involved in a "multi-vehicle collision" might input data including sensor information showing multiple impacts and an audio description of the accident. The system generates a query key based on this data and automatically aligns it with the reference keys in the database. Upon finding a match with the "multi-vehicle collision" reference key, the system identifies and suggests legal representatives who specialize in handling complex traffic accidents with multiple parties involved. In another scenario, a user reports a "hit-and-run" incident by providing dashcam footage and an audio description of the fleeing vehicle. The system processes this information to create a query key, which is then compared against the stored reference keys. When the system aligns the query key with the "hit-and-run" reference key, it automatically identifies legal professionals who have expertise in pursuing hit-and-run cases, ensuring the user is connected with the right legal assistance. For a "DUI" incident, the user might submit breathalyzer results and an audio account of their encounter with law enforcement. The system generates a query key from this data and aligns it with the reference keys. Upon finding a match with the "DUI" reference key, the system identifies and recommends legal representatives who specialize in DUI defense. By automatically comparing the query key to the reference keys, the system efficiently matches users with the appropriate legal representatives, tailored to the specific details of their incidents.

At block 120, the computer-implemented method may include concurrently transmitting, over a communication link over the computer network from the application executing on the remote client device, the electronic data to the relevant legal representative and establishing communication between the one or more users and the relevant legal representative. The one or more users may indicate a presence of the incident by name of the incident type. For instance, if a user involved in a "multi-vehicle collision" reports the incident through the application, the system transmits sensor data showing multiple impacts and an audio description of the accident to a legal representative specializing in multi-vehicle collisions. Concurrently, the system establishes a communication link, such as a video call, between the user and the legal representative, allowing the user to discuss the incident in detail.

In the case of a "hit-and-run" incident, the user might upload dashcam footage and provide an audio description of the fleeing vehicle. The system sends this electronic data to a legal representative experienced in handling hit-and-run cases. Simultaneously, the user is connected with the legal representative through a phone call or video conference, enabling real-time communication and immediate legal advice tailored to the specifics of the incident. For a "DUI" scenario, the system transmits breathalyzer results and an audio account of the user's interaction with law enforcement to a legal representative specializing in DUI defense. At the same time, concurrently, or simultaneously the user is linked to the legal representative via a communication link, facilitating direct consultation. The user can indicate the presence of the incident by naming it "DUI," ensuring the legal representative is fully informed about the nature of the case. This concurrent transmission of data and establishment of communication ensures that users receive timely and relevant legal assistance, enhancing the effectiveness of the support provided. In another example, a user involved in a "DUI" incident might use the application to request a legal representative. The system receives the request and processes the input signal indicating the incident is a DUI. It then sends a list of DUI defense attorneys to the user's device. The user selects an attorney from the list, and the system establishes a communication link for real-time consultation. These examples illustrate how the method efficiently matches users with relevant legal representatives based on the specific details of their incidents, ensuring prompt and appropriate legal assistance In some embodiments, the one or more sensors may be a camera interface enabled to capture one or more images of the incident. In some embodiments, the one or more sensors may be an airbag deployment sensor to activate the camera interface when an airbag may be deployed. In some embodiments, the one or more sensors may be an accelerometer to activate the camera interface when a collision may be detected. In an example scenario where a sensor detects a fire in a vehicle, the system collects data from smoke detectors, temperature sensors, and user reports (audio inputs stating "fire detected"). The application processes this data, tags the incident as a "fire," and searches the database for legal representatives who specialize in fire-related incidents. The system then lists these representatives based on their relevance and experience, providing users with quick access to the appropriate legal help. This process ensures that legal representatives are accurately associated with incidents based on detailed, weighted criteria, and stored in a way that allows for efficient retrieval and utilization.

In some embodiments, the one or more sensors may be a GPS sensor to provide a location of the incident. In some embodiments, the one or more sensors may be a gyroscope to determine severity of the incident. In some embodiments, the input audio signal may be captured by a microphone interface. In some embodiments, the remote client device in electrical communication with the one or more sensors located within a proximity to a vehicle. In some embodiments, the communication between the one or more users and the relevant legal representative may be voice communication. In some embodiments, the communication between the one or more users and the relevant legal representative may be a video conference.

The system employs advanced sensor technologies to detect and analyze incidents and subsequently connects users with appropriate legal representatives via video conferences or phone calls. This communication framework ensures prompt and efficient interaction, in the immediate aftermath of an incident. In an example embodiment, upon the detection of a vehicle crash, the system utilizes one or more sensors, including but not limited to, an accelerometer, a gyroscope, an impact sensor, an acoustic sensos, a GPS sensor, and/or an airbag deployment sensor. These sensors collectively provide a comprehensive data set that allows the system to accurately identify and categorize the incident.

For instance, an accelerometer measures sudden deceleration or impact forces, while gyroscopes monitor changes in the vehicle's orientation and angular velocity. Impact sensors detect physical contact and deformation, and acoustic sensors capture the sounds associated with the crash. GPS sensors provide precise location data, and airbag deployment sensors confirm the occurrence of significant impacts through the activation of airbags.

As noted above, to effectively detect a vehicle crash, a variety of sensors can be implemented in the system, each playing a crucial role in accurately identifying and assessing the incident. Accelerometers are fundamental in this setup as they measure the sudden deceleration or impact forces that occur during a crash. These sensors detect rapid changes in velocity, providing immediate indication of a collision. Additionally, gyroscopes can be used to monitor the vehicle's orientation and angular velocity, which helps in understanding the nature and severity of the crash by analyzing how the vehicle's position changes during the incident. Impact sensors, strategically placed at different points around the vehicle, are designed to detect direct physical contact and deformation of the vehicle's structure. These sensors provide precise information on where the vehicle was hit and the force of the impact. Complementing these are acoustic sensors, which capture the sounds associated with a crash, such as the noise of the collision itself or the deployment of airbags. By analyzing the audio data, the system can differentiate between different types of crashes and other loud noises that might not be related to a crash.

Furthermore, GPS sensors offer valuable data by providing the exact location of the vehicle at the time of the crash. This spatial information is crucial for emergency response teams and for reconstructing the event. Airbag deployment sensors are also integral, as the activation of airbags is a strong indicator of a significant impact. When airbags deploy, these sensors send an immediate signal to the system, confirming the occurrence of a crash. Combining data from these various sensors allows the system to accurately detect, verify, and analyze vehicle crashes. This multi-sensor approach ensures that the system can promptly and reliably identify crash incidents, enabling rapid response and accurate incident documentation.

In implementations, once the system processes and analyzes the sensor data to confirm and categorize the incident, it searches the identification database for legal representatives who specialize in handling such incidents. The database is designed to store detailed information about legal representatives, categorized by their areas of expertise and experience with specific types of incidents. Upon identifying a suitable legal representative, the system facilitates communication between the user including, but not limited to, the vehicle owner and/or the driver and the legal representative through video conferencing or phone a call. Video conferencing offers several advantages, including the ability to conduct face-to-face interactions for discussing the intricate details of the incident and providing immediate legal advice. The visual component of video conferencing enhances trust and understanding between the parties involved, which is essential for effective legal consultation. In scenarios where video conferencing is not feasible due to technical constraints or user preferences, voice communication such as a phone call may serve as an alternative communication method. Voice communication ensures that communication remains quick and efficient, providing a reliable means for the user to receive timely legal assistance. This method is particularly useful when users require urgent legal advice but may not have access to a stable internet connection necessary for video conferencing. Both video conferencing and voice communication are integral to the system's communication framework, ensuring that users have immediate access to legal representatives. This approach enhances the system's responsiveness, ensuring that users receive necessary legal guidance in a timely manner, thereby improving the overall effectiveness of legal interventions following an incident.

Figure 2:
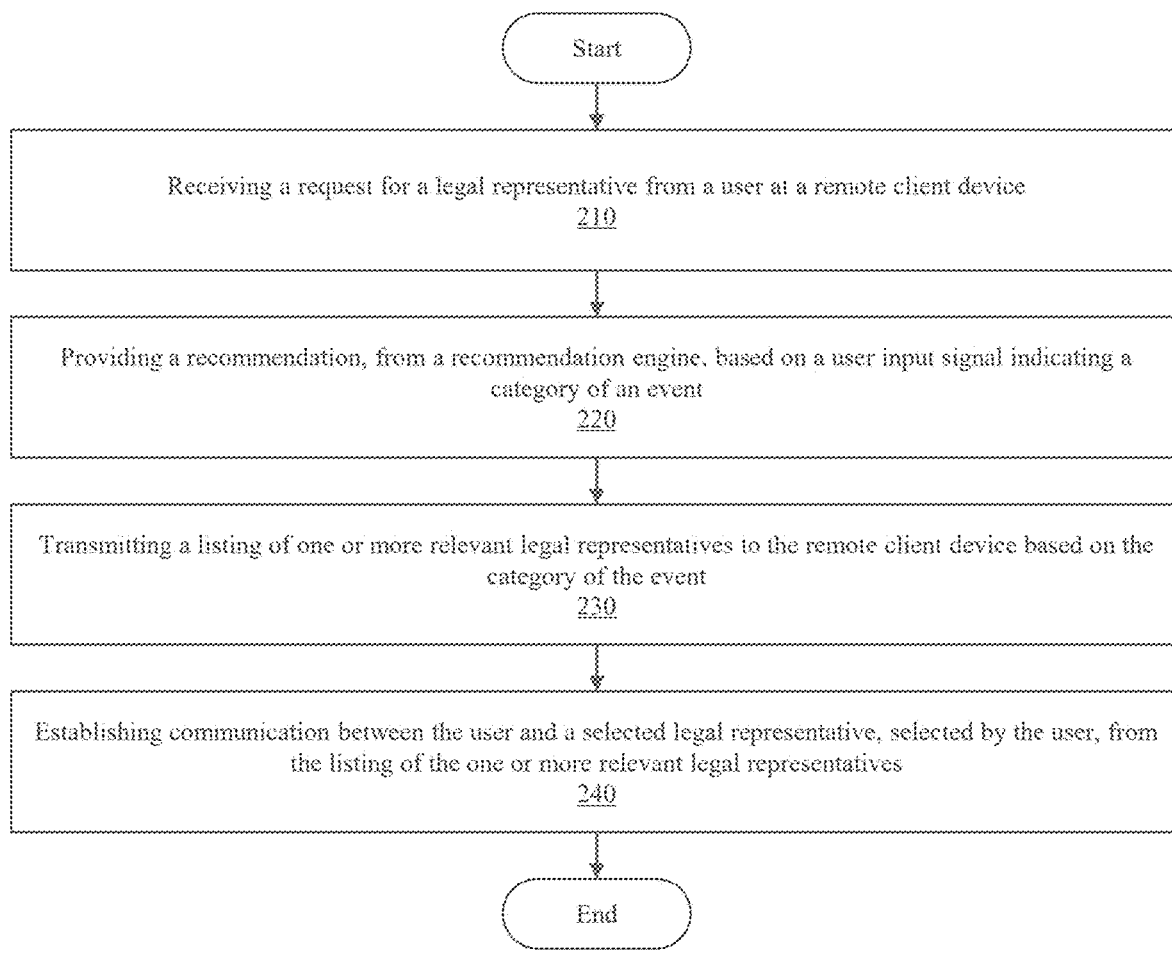
FIG. 2 is a flowchart illustrating an implementation of a method of coordinating communication, according to some embodiments of the present disclosure.

FIG. 2 is a flowchart that describes a method, according to some embodiments of the present disclosure, involving a non-transitory computer-readable medium. At block 210, the method includes receiving a request for a legal representative from a user at a remote client device. For example, a user involved in a "multi-vehicle collision" may use their smartphone to request legal assistance through the application. The system receives this request and begins processing it. At block 220, the method involves providing a recommendation from a recommendation engine based on a user input signal indicating a category of an event. In this case, the user might input details about the collision, such as the number of vehicles involved and the nature of the impacts. The recommendation engine processes this input and categorizes the event as a "multi-vehicle collision." At block 230, the method includes transmitting a listing of one or more relevant legal representatives to the remote client device based on the category of the event. For instance, the system generates a list of legal representatives who specialize in multi-vehicle accidents and sends this list to the user's smartphone. The user can then review the list to select a suitable legal expert. At block 240, the method involves establishing communication between the user and a selected legal representative from the listing. The user selects a legal representative from the list, and the system sets up a communication link, such as a video call or phone call, between the user and the selected legal expert. This ensures the user can immediately discuss their case and receive the necessary legal guidance.

In implementations, upon installation, the user can activate the application in the event of an automotive collision while awaiting law enforcement arrival. Initiating the application establishes a connection with a local attorney from a pre-established law firm that subscribes to the service. The attorney, accessible via a FaceTime interface, may be based locally or at a centralized call center, ensuring immediate and personalized legal assistance. During the video call, the user can articulate the accident details in real-time, visually inspect and document vehicular damage, and provide a comprehensive visual record of the accident scene, all of which can be captured as high-resolution images or video recordings within the application. Moreover, the user can document any physical injuries sustained, such as lacerations or contusions, utilizing the application's timestamped imaging functionality for future legal reference. The attorney can dispatch legal documents, referred to as Doc Signs, through the application, facilitating the establishment of legal representation prior to police arrival. Upon the arrival of law enforcement, if direct communication with the attorney is necessary, the user can hand over the device to enable direct interaction.

In implementations when internet connectivity is compromised, the application is configured to transition to an alternative communication mode, such as a direct phone call or live chat, preserving the functionality of all critical features. The application's architecture supports deployment across various states and municipalities, ensuring broad geographic coverage. For instance, a law firm operating in multiple jurisdictions can integrate each state and city into the application's network, providing uniform legal support. While awaiting police presence, users can access a repository of educational videos embedded within the application. These videos provide strategic guidance on post-accident procedures, including critical communication strategies with insurance companies, identification of non-beneficial documents from insurers, and detailed instructions on managing medical treatment and maintaining appointments with healthcare providers. This ensures that users are well-informed and adequately prepared to handle the aftermath of an automotive collision.

Figure 3:
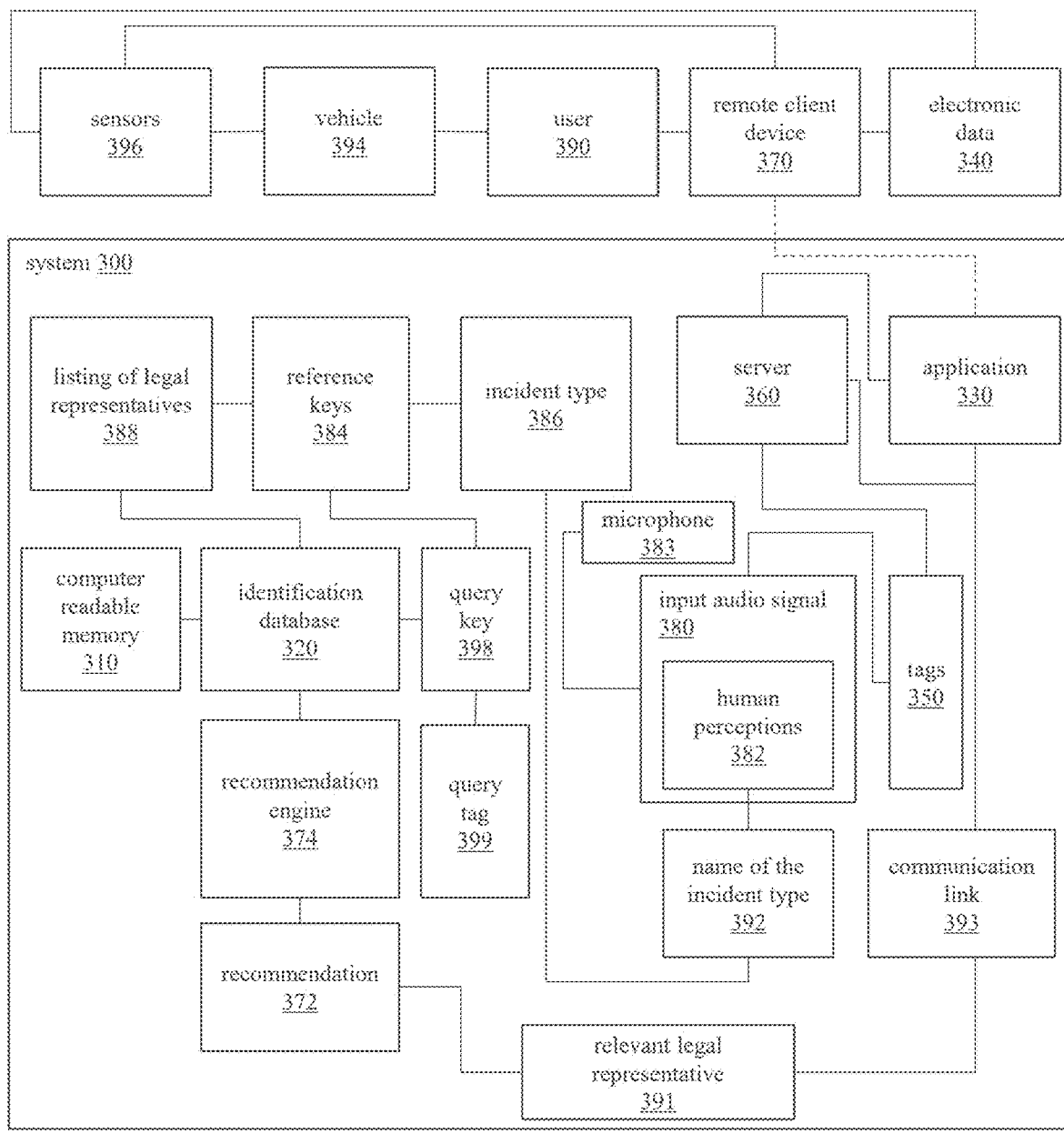
FIG. 3 is a block diagram illustrating a system that may implement the methods of FIGS. 1-2, according to some embodiments of the present disclosure.

FIG. 3 is a block diagram that describes an example system 300, according to some embodiments of the present disclosure for coordinating communication and data collection related to unforeseen events or medical emergencies during an automotive incident for legal assistance. In some embodiments, the system 300 may include computer readable memory 310, an identification database 320 of a listing of one or more legal representatives 388 based on one or more reference keys 384 to an incident type 386, a server 360, an application 330 on the server 360 accessible to one or more users 390, a remote client device 370, electronic data 340 from one or more sensors 396, an input audio signal 380 of the one or more users 390. One or more tags 350 are received over the server 360 from the application 330 executing on a remote client device 370, from at least one of the electronic data 340 from one or more sensors 396 or the input audio signal 380 of the one or more users 390 comprising one or more human perceptions 382 of categories of an incident, wherein the one or more users 390 indicates a presence of the incident by name of the incident type 392. The electronic data 340 and the input audio signal 380 of the received tags 350 are configured to develop the listing of the one or more legal representatives 388 associated with the name of the incident type 392 of the received tags 350.

The electronic data 340, the one or more reference keys 384, and the names of the incident type 392 indicated by the one or more users 390 as corresponding to the received tags 350 used to develop the reference keys 384 are stored in identification database 320 of computer readable memory 310. A recommendation engine 374 provides a recommendation 372 based on indicating the result of the processing, to a querying user a desired legal representative from the listing of the one or more legal representatives 388 by comparing a query key 398 to the one or more reference keys 384. A query tag 399 configured to capture, from the querying user, the electronic data 340 and an input audio signal 380 of one or more human perceptions 382 of an incident, from a desired incident type. The electronic data 340 and the input audio signal 380 of the captured query tag 399 is processed to develop the query key 398 that implements logic to associate a relevant legal representative 391 with the desired incident type based on the one or more reference keys 384. The system is configured to automatically align and compare the query key 398 to the reference keys 384 stored in the identification database 320 to identify the relevant legal representative 391. The system is configured to concurrently transmit, over a communication link 393 over the server 360 from the application executing on the remote client device 370, the electronic data 340 to the relevant legal representative 391 and establishing communication between the one or more users 390 and the relevant legal representative 391.

In some embodiments, the input audio signal 380 may include one or more human perceptions 382 of categories of an incident. The one or more users 390 may indicate a presence of the incident by name of the incident type 392. A listing of one or more legal representatives 388 associated with the incident type of the received tags to be generated when concurrently processing the electronic data 340 and the input audio signal 380 of the received tags.

In some embodiments, storing the electronic data 340, the one or more reference keys 384, and the names of the incident type 392 indicated by the one or more users 390 as corresponding to the received tags used to develop the reference keys 384. Providing a recommendation 372, from a recommendation engine 374, indicating the result of the processing, to a querying user a desired legal representative from the listing of the one or more legal representatives 388 by comparing a query key 398 to the one or more reference keys 384.

In some embodiments, capturing in a query tag 399, from the querying user, the electronic data 340 and an input audio signal 380 of one or more human perceptions 382 of an incident, from a desired incident type. Processing the electronic data 340 and the input audio signal 380 of the captured query tag 399 to develop the query key 398 that implements logic to associate a relevant legal representative 391 with the desired incident type based on the one or more reference keys 384.

In some embodiments, automatically aligning and comparing the query key 398 to the reference keys 384 stored in the identification database 320 to identify the relevant legal representative 391. Concurrently transmitting, over a communication link 393 over the server 360 from the application 330 executing on the remote client device 370, the electronic data 340 to the relevant legal representative 391 and establishing communication between the one or more users 390 and the relevant legal representative 391.

In some embodiments, the one or more sensors 396 may be a camera interface enabled to capture one or more images of the incident. In some embodiments, the one or more sensors 396 may be an airbag deployment sensor to activate the camera interface when an airbag may be deployed. In some embodiments, the one or more sensors 396 may be an accelerometer to activate the camera interface when a collision may be detected. In some embodiments, the one or more sensors 396 may be a GPS sensor to provide a location of the incident. In some embodiments, the one or more sensors 396 may be a gyroscope to determine severity of the incident. In some embodiments, the input audio signal 380 may be captured by a microphone 383 interface. In some embodiments, the remote client device 370 in electrical communication with the one or more sensors 396 located within a proximity to a vehicle 394. In some embodiments, the communication between the one or more users 390 and the relevant legal representative 391 may be voice communication. In some embodiments, the communication between the one or more users 390 and the relevant legal representative 391 may be a video conference.

Figure 4:
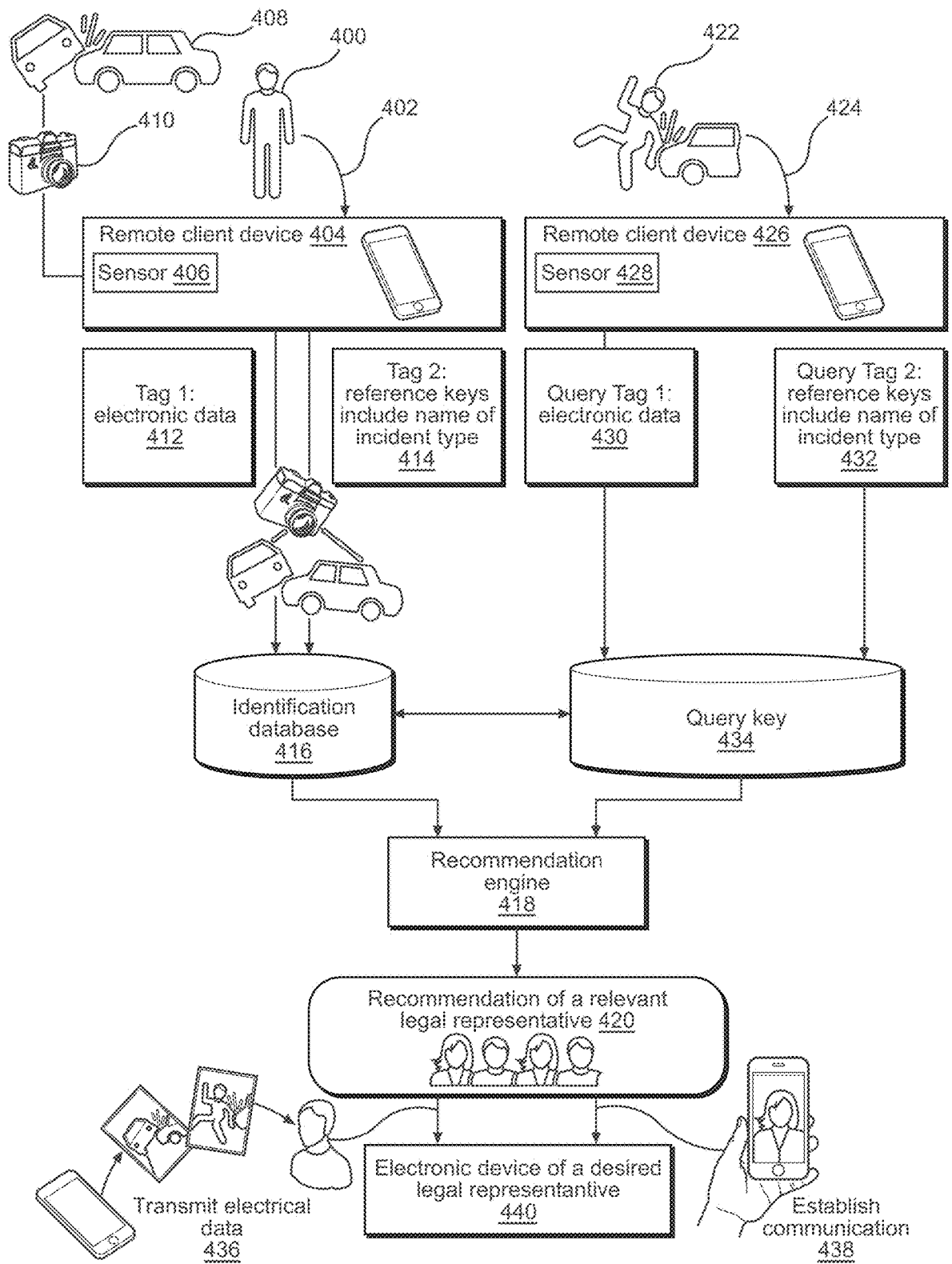
FIG. 4 is a block diagram illustrating the machine learning training process implemented by the system of FIG. 3 in which received tags from electronic data and/or input signals are associate an incident type with one or more relevant legal representatives to produce recommendations in the form of a list, according to some embodiments of the present disclosure.

FIG. 4 is a block diagram illustrating the training process of received tags from electronic data and/or input signals and associating the received tags with one or more relevant legal representatives to produce recommendations. In implementations a method for processing tags uses a recommendation engine to generate a recommendation, facilitate electronic data transmission, and establish communication with a desired legal representative. Initially, one or more users, such as a training user 400, input a training signal 402 into a remote client device 404. The remote client device 404 is equipped with one or more sensors 406, such as a camera or video recorder, configured to capture images of evidence, such as crash damage during an automotive incident or event. Additionally, a vehicle 408 may possess one or more sensors 410 designed to collect electronic data, which can be transmitted to the remote client device 404. A first tag, consisting of electronic data 412, is transmitted from the remote client device 404 to an identification database 416. A second tag includes reference keys such as the name of the incident type 414, which is also transmitted to the identification database 416. These tags are then processed by the recommendation engine 418, which generates a recommendation listing of relevant legal representatives 420. Subsequently, a querying user 422 inputs an input signal 424 into a remote client device 426. This remote client device 426 may also have one or more sensors 428. The first query tag, containing electronic data 430, and the second query tag, which includes reference keys with the name of the incident type 432, are used to form a query key 434. The query key 434 communicates with the identification database 416 to compare the query tags. The data associated with the query tags is transmitted to the recommendation engine 418 for processing. The recommendation engine 418 processes the query and provides a list of suitable legal representatives. The desired legal representative 440, equipped with an electronic device capable of receiving transmitted electronic data 436, establishes communication 438 as requested by the querying user. This structured approach ensures the efficient processing of incident-related data, accurate recommendations of legal representatives, and seamless communication establishment for immediate legal consultation.

Figure 5:
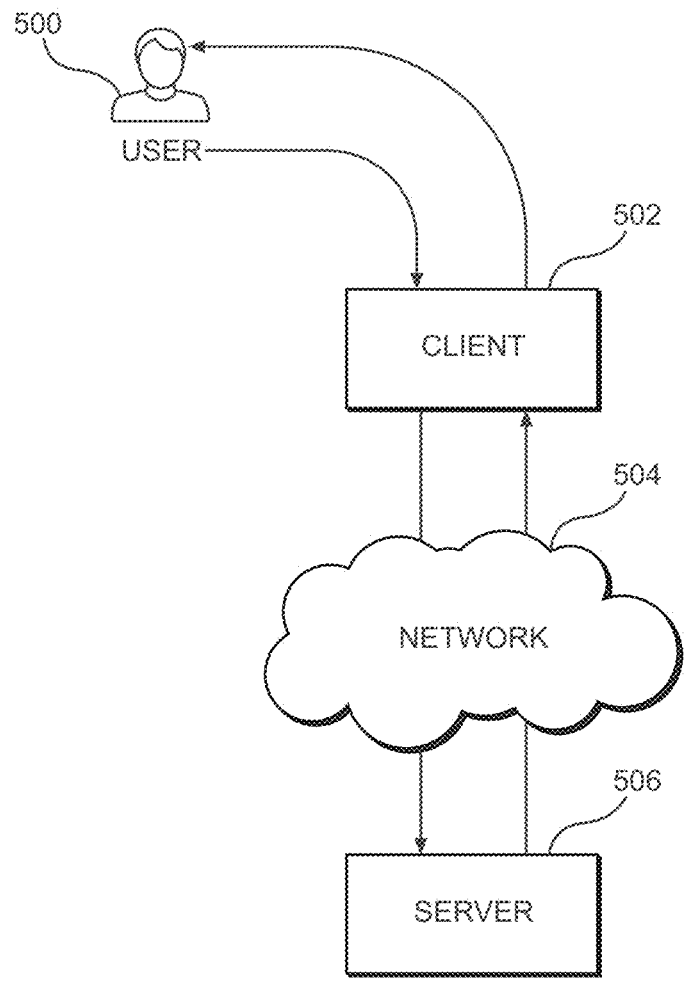
FIG. 5 is a diagram illustrating an example cloud-based client-server system, according to an embodiment.

FIG. 5 illustrates a cloud-based client-server system, according to an embodiment. A system is configured to associate legal representatives with specific incidents, such as vehicle crashes. In this system, a user 500 interacts with a client device 502. This client device 502 can be any device capable of sending and receiving information, including mobile phones, portable devices, smart speakers, robots, vehicles, and remote servers. Some client devices operate as stand-alone units, while others are part of a network of interconnected servers running specialized software. Client device 502 is equipped to receive user inputs through various methods, including typing on a keyboard, moving and clicking a mouse, tapping or swiping on a touch screen, making gestures detected by a camera, or through neural activity sensing. It also provides responses or feedback to the user through different output methods such as text, icons, images, audio tones, synthesized speech, vibration, or neural stimulation. The client device 502 communicates with server 506 via network 504. Server 506 handles the natural language processing, manages databases of user preferences and incident details, and generates recommendations for appropriate legal representatives based on the incident attributes. The server sends the processed responses and recommendations back to the client device 502, which then interfaces with the user 500. Some embodiments use a voice interface for communication between user 500 and client device 502, while others utilize manual interfaces like keyboards or touch screens. Additionally, some systems incorporate cognitive communication devices (CCDs) that leverage human thoughts as a form of natural language input. Various other human-machine interfaces may also be employed, depending on the specific requirements of the system.

Figure 6:
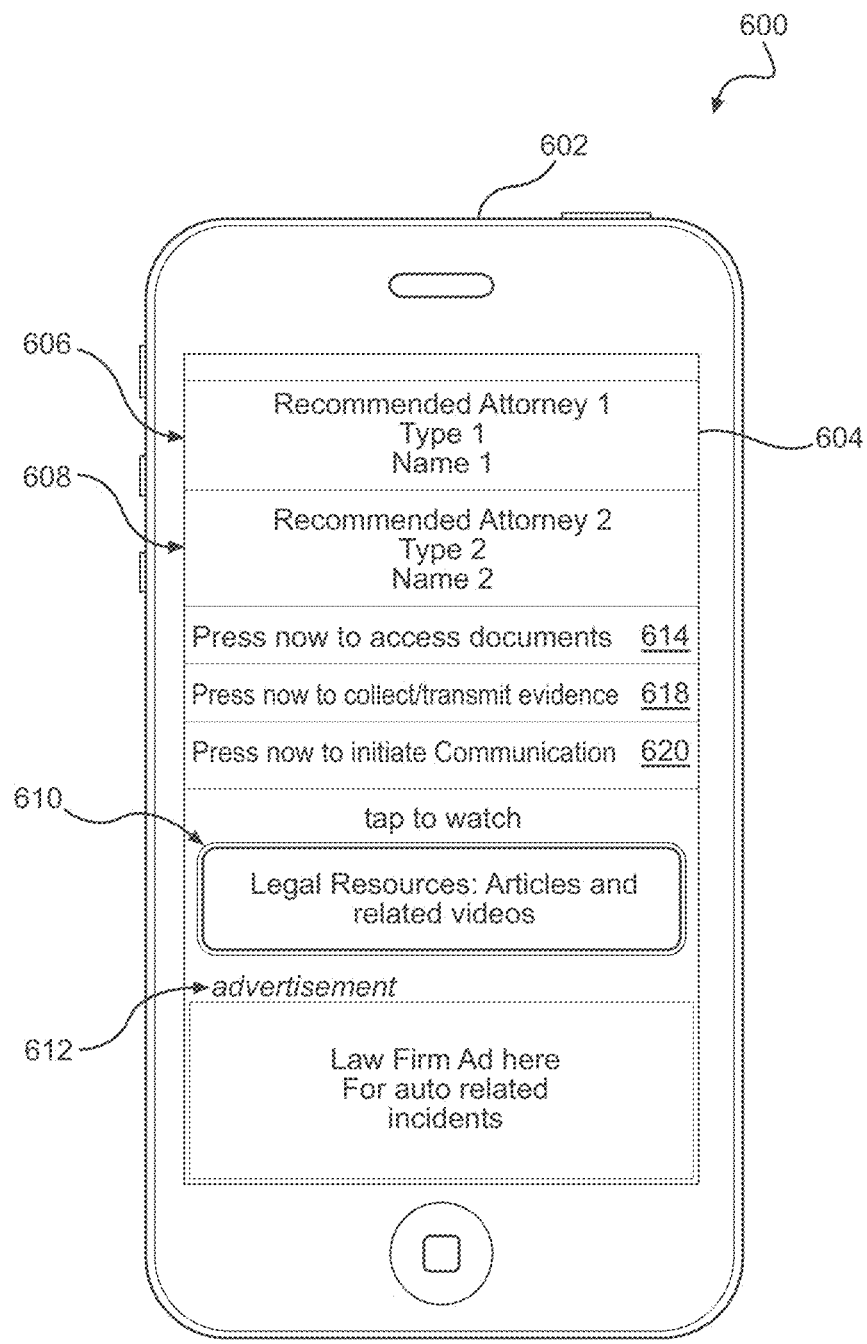
FIG. 6 is a diagram illustrating a display device showing an operational sequence that may be performed when implementing the system of FIG. 3 for running the application for relevant legal representative recommendations based on an incident type, according to an embodiment.

FIG. 6 depicts an embodiment of a display device 600 such as an electronic device, a remote client device, a mobile phone, a smart phone, a tablet, and/or a computer showing an operational sequence that may be performed when implementing the system of FIG. 3 for running the application to associate legal representatives with specific incidents, such as vehicle crashes, utilizing a mobile phone 602 with a touch screen display interface 604. The mobile phone 602 runs an application that displays information about legal representatives based on the incident being analyzed. For example, while the system is processing data from a vehicle crash, the mobile phone 602 shows details about relevant legal representatives 606, including their names and areas of expertise, which are tailored to the nature of the incident. The mobile phone 602 also presents a list of other recommended legal representatives 608, selected based on their suitability and expertise related to the specific attributes of the incident. These recommendations align with the user's previously expressed preferences and the characteristics of the incident. Additionally, the mobile phone 602 displays links to related legal resources 610, such as articles or guides on handling vehicle crashes, which are suggested based on their relevance to the incident and user preferences. Furthermore, the mobile phone 602 may show advertisements 612 for legal services. Although advertisements typically have fewer attributes in common with the incident or legal representatives, these ads are recommended based on the similarity between the user's preferences and those of other users who have shown interest in similar services. The management of legal representative data, resource links, and advertisements, along with the recommendation processes, may involve different servers operated by various entities, each representing distinct embodiments in the system.

Figure 7:
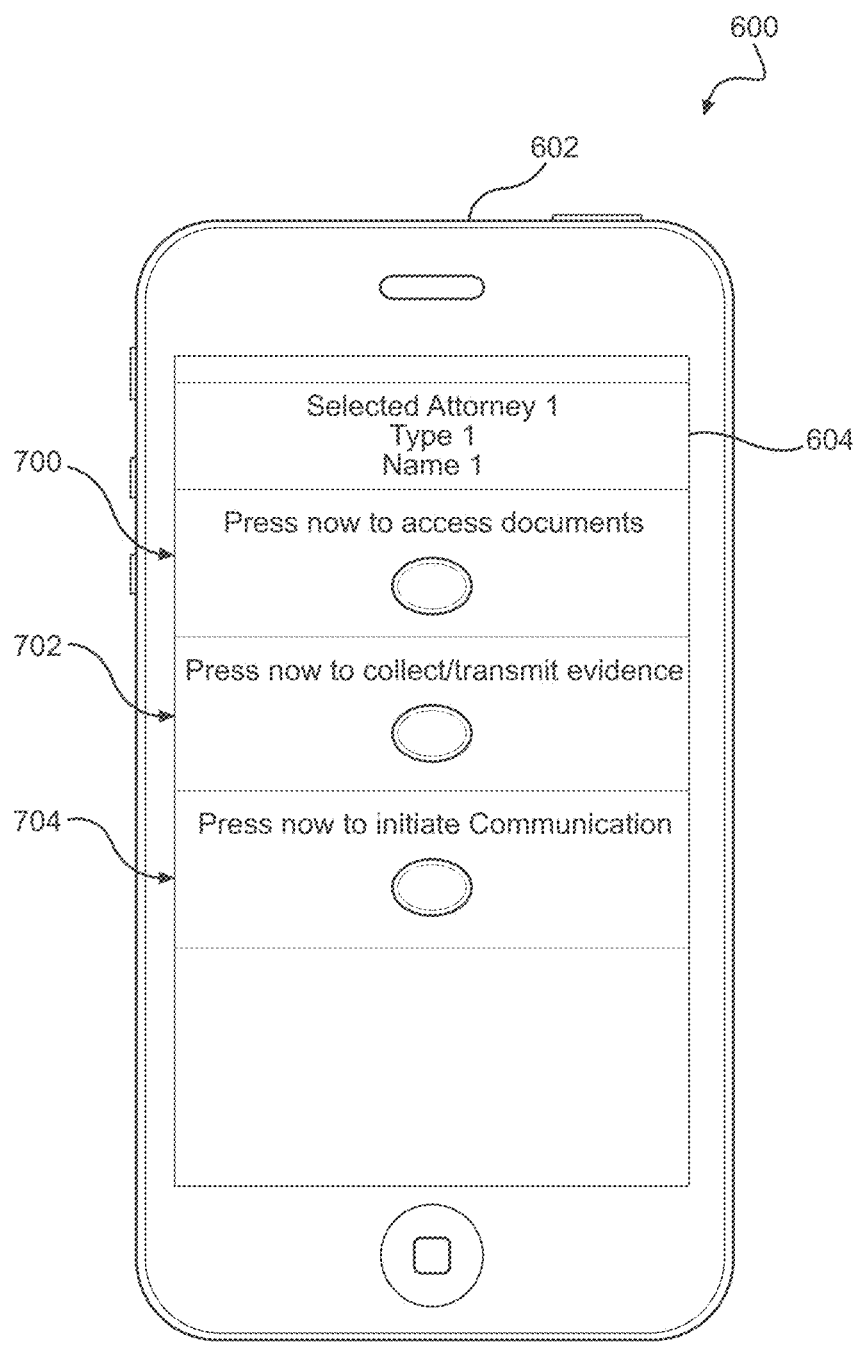
FIG. 7 is a diagram illustrating the display device 600 of FIG. 6 showing an operational sequence that may be performed for running the application for relevant legal representative recommendations based on an incident type, according to an embodiment.

FIG. 7 illustrates the display device 600 of FIG. 6 showing an operational sequence that may be performed when running the application to associate legal representatives with specific incidents, such as vehicle crashes, utilizing a mobile phone 602 with a touch screen display interface 604. At block 700, the user may interact with an icon to access legal documents, such as Representation Agreements and Power of Attorney documents, pertinent to the desired legal representative. For instance, if the user has been involved in a severe rear-end collision, they might need to quickly access a Power of Attorney document to authorize legal representation for the desired attorney for medical or insurance claims.

At block 702, the user can select an icon to initiate the collection of electronic data from one or more sensors, including a camera on a smartphone or a video recording device, thereby activating the recording of a video. This electronic data, potentially serving as evidence, may be transmitted to a database for storage or directly to a selected legal representative from the recommended attorney list. For example, after a hit-and-run incident, the user might capture video footage of the scene, including the fleeing vehicle's license plate, which is crucial evidence for legal proceedings. At block 704, the user may initiate communication with a desired attorney from the recommended attorney list, which could involve a telephonic communication or a video call. For instance, following a DUI incident, the user may need immediate legal advice and could use this feature to contact a legal representative specializing in DUI cases via a video call to discuss the next steps and legal implications. Some embodiments in FIG. 8A-8D, involve non-transitory computer-readable media containing code that, when executed by a computer system, prompt the system to carry out the specified functions and processes.

Figure 8A:
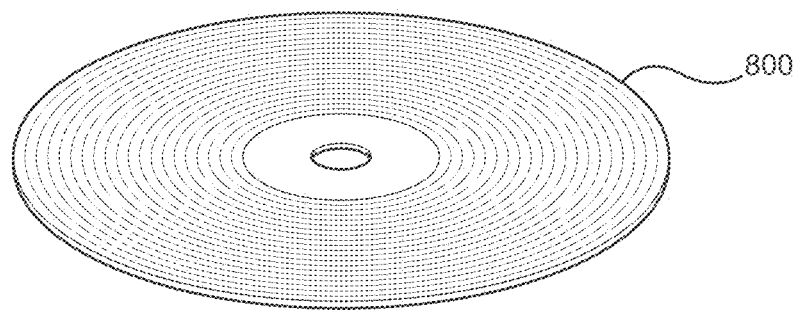
FIG. 8A illustrates a rotating magnetic non-transitory computer readable medium, according to an embodiment.
Figure 8B:
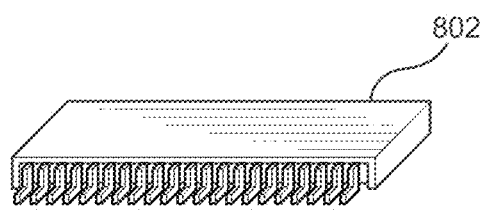
FIG. 8B illustrates a packaged non-volatile memory type of non-transitory computer readable medium, according to an embodiment.
Figure 8C:
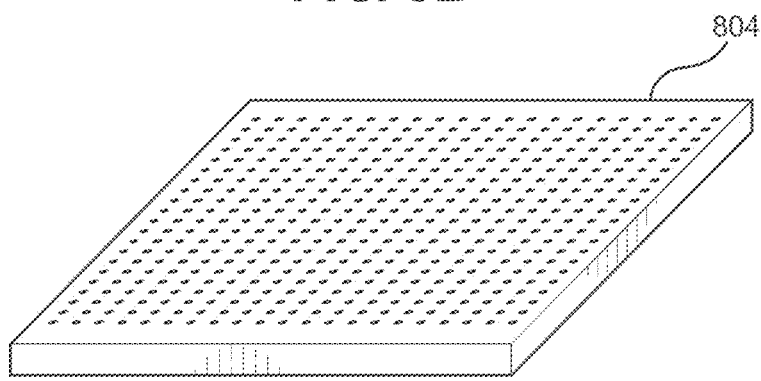
FIG. 8C illustrates a packaged system-on-chip with a ball grid array side visible, according to an embodiment.
Figure 8D:
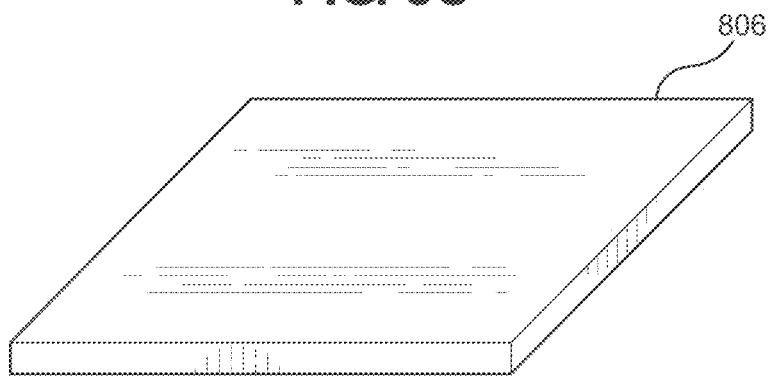
FIG. 8D illustrates a packaged system-on-chip with its top side visible, according to an embodiment.

FIG. 8A illustrates an embodiment of such a medium, represented by a rotating magnetic disk 800. FIG. 8B depicts another embodiment, a Flash RAM chip 802. Additionally, some embodiments include computer chips equipped with processors designed to execute the relevant functions and processes. FIG. 8C shows an embodiment of a packaged system-on-chip (SoC) 804, featuring a ball-grid array of solder balls for mounting on printed circuit boards. FIG. 8D displays the top view of SoC 806.

Figure 9:
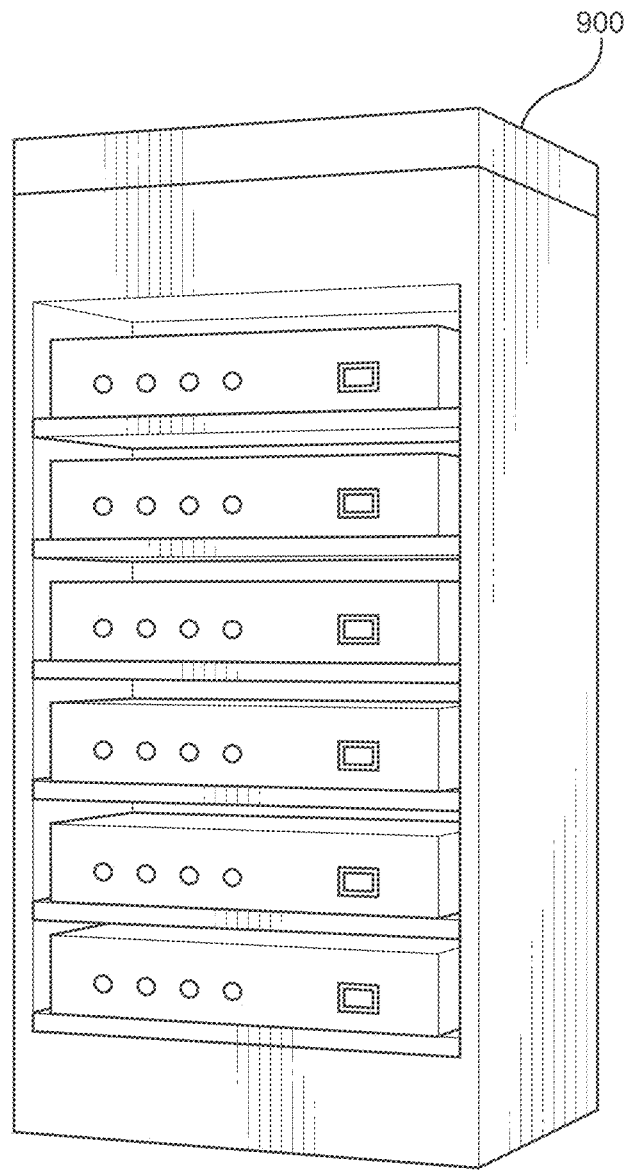
FIG. 9 illustrates a server system, according to an embodiment.

FIG. 9 depicts an embodiment of a rack-mounted server system 900 designed to associate legal representatives with specific incidents, such as vehicle crashes. This system is equipped with multiple processors that work in parallel to perform several critical functions. These include processing multiple incident reports and legal queries simultaneously, managing and retrieving data related to user preferences and incident attributes, and running algorithms to match users with appropriate legal representatives efficiently.

Figure 10:
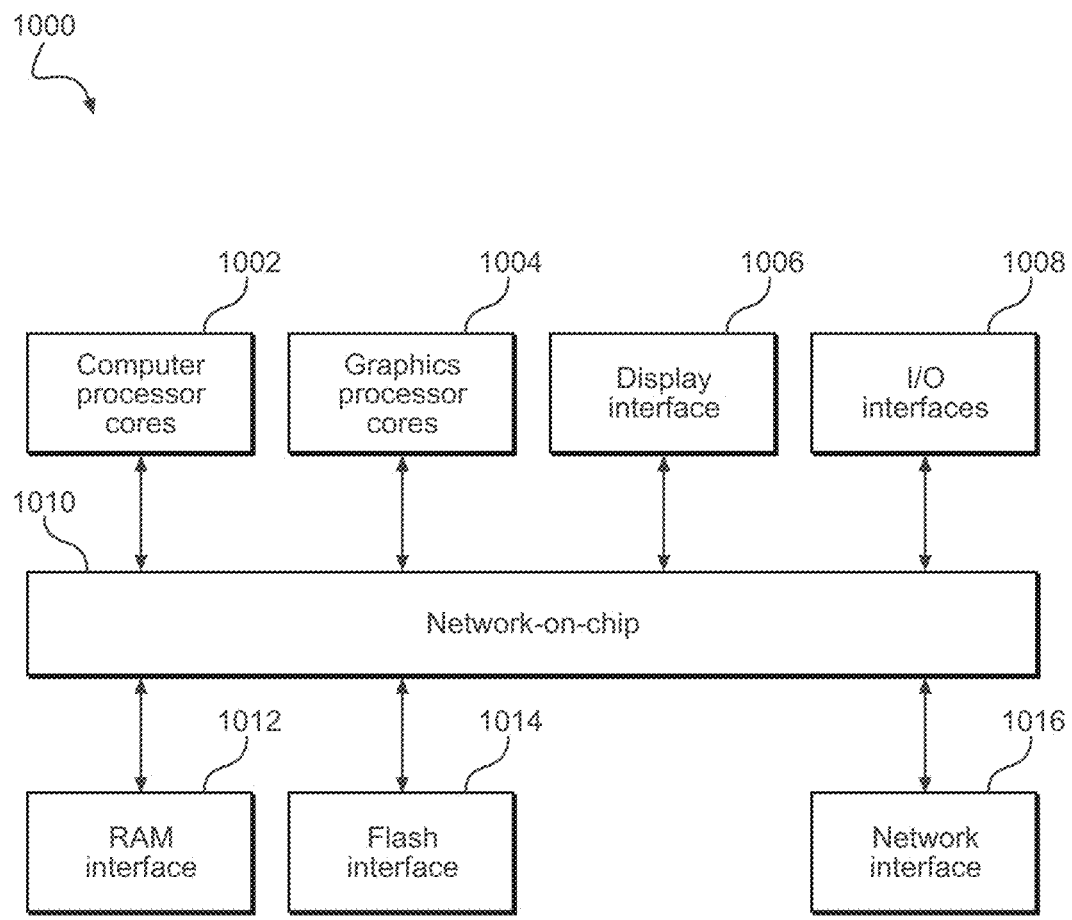
FIG. 10 illustrates a block diagram of a system-on-chip, according to an embodiment.

FIG. 10 illustrates a block diagram of a system-on-chip (SoC) 1000 designed for a system that associates legal representatives with specific incidents, such as vehicle crashes. The SoC 1000 includes a cluster of central processing unit (CPU) cores 1002 and a cluster of graphics processing unit (GPU) cores 1004. These processors are interconnected via a network-on-chip 1010, which provides connectivity to both an off-chip dynamic random-access memory (DRAM) interface 1012 and a Flash memory interface 1014. The SoC 1000 also features a display interface 1006 and an I/O interface module 1008 linked to the memory interfaces. The I/O interface supports connections for touch screens, microphones, speakers, and USB devices like keyboards and mice, allowing these peripherals to interact with the memory and processing units. Additionally, the SoC 1000 includes a network interface 1016, enabling the processors to connect to the Internet through either wired or wireless connections. By executing instructions stored in the DRAM and Flash memory through interfaces 1012 and 1014, respectively, the CPUs 1002 and GPUs 1004 carry out the necessary functions and processes for the system, such as processing incident data and generating recommendations for legal representatives.

Figure 11:
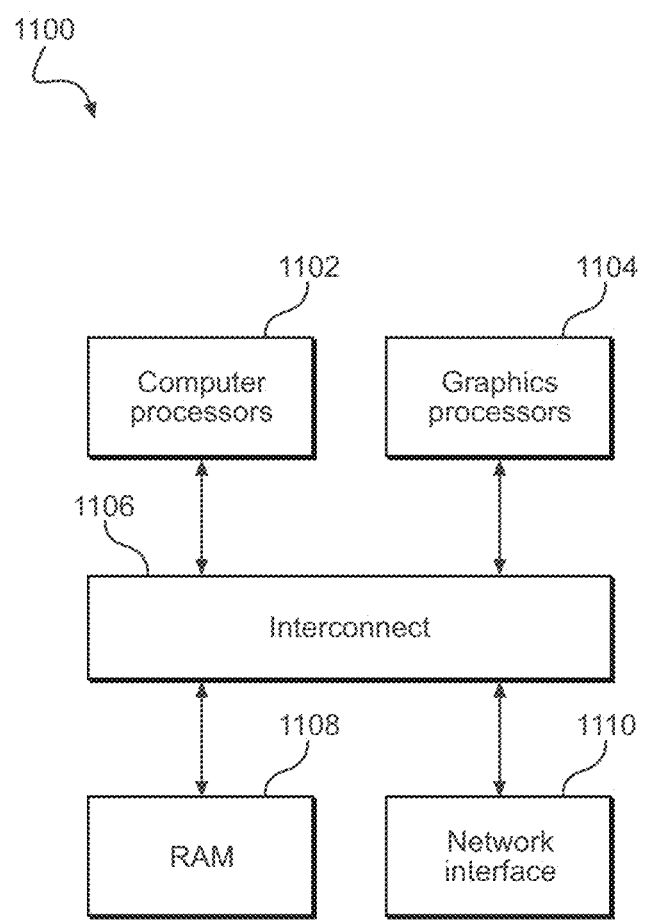
FIG. 11 illustrates a block diagram of a server computer system, according to an embodiment.

FIG. 11 depicts a block diagram of a server system 1100 designed for a system that associates legal representatives with specific incidents, such as vehicle crashes. The server system 1100 includes an array of central processing units (CPUs) 1102 and an array of graphics processing units (GPUs) 1104. These processors are interconnected through a board-level interconnect 1106, which links them to a RAM 1108 and a network interface 1110. The CPUs 1102 and GPUs 1104 execute instructions stored in the RAM 1108 to perform the necessary functions and processes, such as analyzing incident data, managing user preferences, and generating recommendations for legal representatives. The network interface 1110 facilitates communication between the server system 1100 and external networks, enabling it to access and exchange data relevant to the incident and legal representation.

Although this invention has been detailed with reference to specific preferred embodiments, it will be apparent to those skilled in the field that various modifications and equivalents may be made without departing from the spirit and scope of the invention. Specifically, the terms used to describe the components, such as "means," are intended to encompass any component that performs the functions described, even if it does not have the exact structure shown in the illustrated examples. Features disclosed in one embodiment can be combined with features from other embodiments as needed for particular applications. The methods described and claimed herein can be embodied in various forms, including human and machine interactions, where instructions executed by computers perform the described methods. Non-transitory computer-readable media that store such instructions also embody the invention. Physical machines, as described and claimed, can be programmed with numerous variables, allowing for a wide range of operational behaviors. Software tools used to configure hardware description language representations also embody the invention. Physical embodiments of the invention include semiconductor chips, hardware description language representations of machine behavior, and non-transitory computer-readable media storing these representations. According to the invention, client devices, computers, and computing devices are considered articles of manufacture. Examples include electronic components on motherboards, servers, mainframe computers, or specialized computers with processors (e.g., CPUs, GPUs, microprocessors) configured to execute programs for data handling and method execution.

The invention can be implemented in various ways, such as with distinct processors or microprocessors, volatile and non-volatile memory, and peripheral controllers. It can also be realized with integrated microcontrollers that include local memory and peripherals, discrete logic for fixed implementations, or programmable logic that allows for reconfiguration through local or remote interfaces. Such logic may implement control systems either through hardcoded logic or processor-executed commands. With respect to the above description, it is to be realized that the optimum dimensional relationship for the various components of the invention described above and in the illustrations include variations in size, materials, shape, form, function, and manner of operation, assembly and use, are deemed readily apparent and obvious to one skilled in the art, and all equivalent relationships to those illustrates in the drawings and described in the specification are intended to be encompassed by the invention.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method of coordinating communication and data collection based on an input audio signal of one or more users when providing query results to the one or more users, the method comprising:
   generating, by a server, an identification database stored in computer readable memory, the identification database is a listing of one or more legal representatives based on one or more reference keys to an incident type, including:
   establishing an application on the server accessible to the one or more users,
   receiving, over a network from the application executing on a remote client device, one or more tags;
   capturing a first tag comprising:
      electronic data from one or more sensors located within a proximity to a vehicle during an incident; and
      wherein the input audio signal of the one or more users is captured by a microphone interface implemented in the remote client device of the one or more users, the input audio signal comprising one or more human perceptions of categories of an incident evinced by the one or more users to indicate a presence of the incident by stating a name of an incident type,
   concurrently processing the electronic data and the input audio signal of the first tag, in which a recommendation engine to:
      infer context and severity of the incident type based on the first tag to render a classification of the incident type based on the electronic data from the one or more sensors indicating an incident and the input audio signal of the one or more users labeling the incident type;
      assign the inferred classification of the incident type to a first reference key using a machine learning algorithm;
      train the machine learning algorithm to categorize the incident type based on the classification of the incident type and at least one of: a deployment of a sensor of the vehicle and a magnitude of a motion vector for the vehicle; and wherein
      the first reference key to develop the listing of the one or more legal representatives associated with the incident type of the received tags, and
   storing the electronic data, the one or more reference keys, and the names of the incident type indicated by the one or more users as corresponding to the received tags used to develop the reference keys;
   providing a recommendation, from the recommendation engine, indicating the result of the processing, to a querying user a desired legal representative from the listing of the one or more legal representatives by comparing a query key to the one or more reference keys, including:
   capturing in a query tag, from the querying user, the electronic data and an input audio signal of one or more human perceptions of an incident, from a desired incident type,
   processing the electronic data and the input audio signal of the captured query tag to develop the query key that implements logic to associate a relevant legal representative with the desired incident type based on the one or more reference keys, and
   automatically aligning and comparing the query key to at least one of the electronic data or the reference keys stored in the identification database to identify the relevant legal representative; and
   concurrently transmitting, over a communication link over the network from the application executing on the remote client device, the electronic data to the relevant legal representative and establishing communication between the one or more users and the relevant legal representative.

2. The computer-implemented method of claim 1, wherein the one or more sensors is a camera interface enabled to capture one or more images of the incident.

3. The computer-implemented method of claim 2, wherein the one or more sensors is an airbag deployment sensor to activate the camera interface when an airbag is deployed.

4. The computer-implemented method of claim 2, wherein the one or more sensors is an accelerometer to activate the camera interface when a collision is detected.

5. The computer-implemented method of claim 1, wherein the one or more sensors is a GPS sensor to provide a location of the incident.

6. The computer-implemented method of claim 1, wherein the one or more sensors is a gyroscope to determine severity of the incident.

7. The computer-implemented method of claim 1, further comprising:
   capturing a second tag from electronic data from one or more sensors implemented in the remote client device of the one or more users.

8. The computer-implemented method of claim 1, wherein the remote client device in electrical communication with the one or more sensors located within a proximity to a vehicle.

9. The computer-implemented method of claim 1, wherein the communication between the one or more users and the relevant legal representative is voice communication.

10. The computer-implemented method of claim 1, wherein the communication between the one or more users and the relevant legal representative is a video conference.

11. A non-transitory computer-readable medium comprising processor steps that when executed by a processor perform a method, the method comprising:
 receiving a request for a legal representative from a user at a remote client device;
 receiving, over a network from an application executing on the remote client device, one or more tags;
 capturing a first tag comprising:
  electronic data from one or more sensors located within a proximity to a vehicle during an incident; and
  an input audio signal of the one or more users captured by a microphone interface implemented in the remote client device of the one or more users, the input audio signal comprising one or more human perceptions of categories of an incident evinced by the one or more users to indicate a presence of the incident by stating a name of an incident type,
 concurrently processing the electronic data and the input audio signal of the first tag, in which a recommendation engine to:
  infer context and severity of the incident type based on the first tag to render a classification of the incident type based on the electronic data from the one or more sensors indicating an incident and the input audio signal of the one or more users labeling the incident type;
  assign the inferred classification of the incident type to a first reference key using a machine learning algorithm;
  train the machine learning algorithm to categorize the incident type based on the classification of the incident type and at least one of: a deployment of a sensor of the vehicle and a magnitude of a motion vector for the vehicle; and wherein
 the first reference key to develop a listing of one or more relevant legal representatives associated with the incident type of the received tags, and
 storing the electronic data, the one or more reference keys, and the names of the incident type indicated by the one or more users as corresponding to the received tags used to develop the reference keys;
 providing a recommendation, from the recommendation engine, based on a user input signal indicating a category of an event;
 transmitting the listing of the one or more relevant legal representatives to the remote client device based on the category of the event.

12. The non-transitory computer-readable medium comprising processor steps that when executed by a processor perform a method of claim 11, further comprising:
 establishing communication between the user and a selected legal representative, selected by the user, from the listing of the one or more relevant legal representatives.

13. The non-transitory computer-readable medium comprising processor steps that when executed by a processor perform a method of claim 12, wherein the communication between the user and the selected legal representative is voice communication.

14. The non-transitory computer-readable medium comprising processor steps that when executed by a processor perform a method of claim 12, wherein the communication between the user and the selected legal representative is a video conference.

15. The non-transitory computer-readable medium comprising processor steps that when executed by a processor perform a method of claim 12, further comprising:
 transmitting electronic data from one or more sensors to the selected legal representative.

16. The non-transitory computer-readable medium comprising processor steps that when executed by a processor perform a method of claim 15, further comprising:
 concurrently transmitting, over a communication link over a computer network from an application executing on the remote client device, the electronic data to the selected legal representative and establishing communication between the one or more users and the relevant legal representative.

17. The non-transitory computer-readable medium comprising processor steps that when executed by a processor perform a method of claim 11, wherein the recommendation engine providing the recommendation at least partially based on electronic data from one or more sensors, and
 wherein the remote client device in electrical communication with the one or more sensors located within a proximity to a vehicle.

18. The non-transitory computer-readable medium comprising processor steps that when executed by a processor perform a method of claim 17, wherein the one or more sensors is a camera interface enabled to capture one or more images of the event.

19. The non-transitory computer-readable medium comprising processor steps that when executed by a processor perform a method of claim 17, wherein the one or more sensors is an airbag deployment sensor to activate a camera interface when an airbag is deployed.

20. A computer-implemented method, the method comprising:
 generating an identification database stored in computer readable memory, the identification database is a listing of one or more legal representatives based on one or more reference keys to an incident type, including:
 establishing an application on a server accessible to one or more users,
 receiving, over the server from the application executing on a remote client device, tags from an input signal of the one or more users comprising one or more human perceptions of categories of an incident, wherein the one or more users indicates a presence of the incident by name of the incident type,
 capturing a first tag comprising:
  electronic data from one or more sensors located within a proximity to a vehicle during an incident; and
  an input audio signal of the one or more users captured by a microphone interface implemented in the remote client device of the one or more users, the input audio signal comprising one or more human perceptions of categories of an incident evinced by the one or more users to indicate a presence of the incident by stating a name of an incident type,
 concurrently processing the electronic data and the input audio signal of the first tag, in which a recommendation engine to:

infer context and severity of the incident type based on the first tag to render a classification of the incident type based on the electronic data from one or more sensors indicating an incident and the input audio signal of the one or more users labeling the incident type;

assign the inferred classification of the incident type to a first reference key using a machine learning algorithm;

train the machine learning algorithm to categorize the incident type based on the classification of the incident type and at least one of: a deployment of a sensor of the vehicle and a magnitude of a motion vector for the vehicle; and wherein the first reference key to develop the listing of the one or more legal representatives associated with the incident type of the received tags, and storing the electronic data, the one or more reference keys, and the names of the incident type indicated by the one or more users as corresponding to the received tags used to develop the reference keys;

storing the one or more reference keys, and the names of the incident type indicated by the one or more users as corresponding to the received tags used to develop the reference keys;

providing a recommendation, from the recommendation engine, indicating a result of the processing, to a querying user a desired legal representative from the listing of the one or more legal representatives by comparing a query key to the one or more reference keys, including:

capturing in a query tag, from the querying user, the input signal of the one or more human perceptions of the incident, from a desired incident type, processing the input signal of the captured query tag to develop the query key that implements logic to associate a relevant legal representative with the desired incident type based on the one or more reference keys, and automatically aligning and comparing the query key to the reference keys stored in the identification database to identify the relevant legal representative; and establishing communication, over a communication link over the server from the application executing on the remote client device, between the one or more users and the relevant legal representative.

\* \* \* \* \*